(12) United States Patent
Ma

(10) Patent No.: US 7,555,613 B2
(45) Date of Patent: Jun. 30, 2009

(54) STORAGE ACCESS PRIORITIZATION USING A DATA STORAGE DEVICE

(75) Inventor: Kenneth Ma, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 150 days.

(21) Appl. No.: 11/049,798

(22) Filed: Feb. 3, 2005

(65) Prior Publication Data

US 2005/0257013 A1 Nov. 17, 2005

Related U.S. Application Data

(60) Provisional application No. 60/570,356, filed on May 11, 2004.

(51) Int. Cl.
*G06F 12/00* (2006.01)
*G06F 13/00* (2006.01)

(52) U.S. Cl. ............... 711/151; 711/100; 711/154; 711/158

(58) Field of Classification Search ............ 711/100, 711/118, 154, 158, 151
See application file for complete search history.

(56) References Cited

U.S. PATENT DOCUMENTS

| 244,426 A | 7/1881 | Bell |
| 5,615,352 A | 3/1997 | Jacobson et al. |
| 5,625,811 A * | 4/1997 | Bhide et al. ............... 707/2 |
| 5,640,595 A * | 6/1997 | Baugher et al. ............ 710/10 |
| 5,742,818 A | 4/1998 | Shoroff et al. |
| 5,751,282 A | 5/1998 | Girard et al. |
| 5,790,548 A | 8/1998 | Sistanizadeh et al. |
| 5,790,794 A | 8/1998 | DuLac et al. |
| 5,802,554 A | 9/1998 | Caceres et al. |
| 5,956,400 A | 9/1999 | Chaum et al. |
| 6,317,028 B1 | 11/2001 | Valiulis |
| 6,405,284 B1 * | 6/2002 | Bridge ..................... 711/114 |
| 6,449,647 B1 * | 9/2002 | Colby et al. ............... 709/226 |
| 6,487,170 B1 * | 11/2002 | Chen et al. ................ 370/231 |

(Continued)

FOREIGN PATENT DOCUMENTS

EP    1 398 964 A2    3/2004

(Continued)

OTHER PUBLICATIONS

IBM Corporation, "Object-Oriented Interface Design; IBM Common User Access Guidelines", Dec. 1992, 4 pages, Que Corporation, Carmel, Indiana.

(Continued)

*Primary Examiner*—Tuan V. Thai
(74) *Attorney, Agent, or Firm*—McAndrews, Held & Malloy, Ltd.

(57) ABSTRACT

Herein described is a method and system of prioritizing access to data stored in one or more data processing devices communicatively coupled to the data storage device. The method may be based on the type of data file accessed. Prioritization may be based on data pool or share names. Further, one or more data ports of the data storage device may be used to prioritize access to one or more data files stored in the data storage device. The system may comprise a storage device, one or more data processing devices requesting data file access from the data storage device, a software resident in a memory of the data storage device, a processor executing the software, and a display.

10 Claims, 7 Drawing Sheets

U.S. PATENT DOCUMENTS

| | | | |
|---|---|---|---|
| 6,502,131 B1 * | 12/2002 | Vaid et al. | 709/224 |
| 6,567,981 B1 | 5/2003 | Jeffrey | |
| 6,598,174 B1 | 7/2003 | Parks et al. | |
| 6,640,291 B2 | 10/2003 | Fujibayashi et al. | |
| 6,661,803 B1 * | 12/2003 | Choi et al. | 370/413 |
| 6,721,880 B1 | 4/2004 | Pike | |
| 6,769,127 B1 | 7/2004 | Bonomi et al. | |
| 6,915,307 B1 * | 7/2005 | Mattis et al. | 707/103 R |
| 6,976,134 B1 * | 12/2005 | Lolayekar et al. | 711/148 |
| 7,010,701 B1 * | 3/2006 | Bossemeyer et al. | 711/173 |
| 7,191,286 B2 | 3/2007 | Forrer, Jr. et al. | |
| 7,272,844 B1 | 9/2007 | Bankers et al. | |
| 7,395,546 B1 | 7/2008 | Asmussen | |
| 2001/0029583 A1 | 10/2001 | Palatov et al. | |
| 2001/0056434 A1 | 12/2001 | Kaplan et al. | |
| 2002/0003884 A1 | 1/2002 | Sprunk | |
| 2002/0007416 A1 * | 1/2002 | Putzolu | 709/231 |
| 2002/0029274 A1 * | 3/2002 | Allen | 709/226 |
| 2002/0087653 A1 | 7/2002 | Duroj | |
| 2002/0120697 A1 | 8/2002 | Generous et al. | |
| 2002/0157113 A1 | 10/2002 | Allegrezza | |
| 2002/0174227 A1 * | 11/2002 | Hartsell et al. | 709/226 |
| 2002/0174296 A1 | 11/2002 | Ulrich et al. | |
| 2002/0177471 A1 | 11/2002 | Kaaresoja et al. | |
| 2003/0033494 A1 | 2/2003 | Fujibayashi et al. | |
| 2003/0086023 A1 | 5/2003 | Chung et al. | |
| 2003/0115608 A1 | 6/2003 | Armstrong et al. | |
| 2003/0117500 A1 | 6/2003 | Lin | |
| 2003/0120784 A1 | 6/2003 | Johnson et al. | |
| 2003/0146929 A1 | 8/2003 | Baldwin et al. | |
| 2003/0208763 A1 | 11/2003 | McElhatten et al. | |
| 2004/0044749 A1 * | 3/2004 | Harkin | 709/219 |
| 2004/0047379 A1 | 3/2004 | Kitamura | |
| 2004/0078460 A1 * | 4/2004 | Valavi et al. | 709/224 |
| 2004/0117836 A1 | 6/2004 | Karaoguz et al. | |
| 2004/0193824 A1 | 9/2004 | Johnson | |
| 2004/0258390 A1 | 12/2004 | Olson | |
| 2004/0261093 A1 | 12/2004 | Rebaud et al. | |
| 2005/0015805 A1 | 1/2005 | Iwamura | |
| 2005/0050160 A1 | 3/2005 | Upendran et al. | |

FOREIGN PATENT DOCUMENTS

| | | |
|---|---|---|
| WO | 02/31701 A2 | 4/2002 |
| WO | 02/32140 A2 | 4/2002 |
| WO | 03/025726 A1 | 3/2003 |
| WO | 03/047235 A2 | 6/2003 |
| WO | 2004/023786 A2 | 3/2004 |

OTHER PUBLICATIONS

Tanenbaum, A., "Section 1.4: Hardware, Software, and Multilevel Machines", Structured Computer Organization, 1990, 3 pages, Third Edition, Prentice Hall, Englewood Cliffs, New Jersey.

Berkshire Encyclopedia of Human-Computer Interaction, Definition of "Identity Authentication", 2004, 6 pages, Berkshire Publishing Group, http://www.xreferplus.com, printed Nov. 27, 2007.

Dictionary of Multimedia and Internet Applications: A Guide for Developers and Users, Definition of "IP Address", 1999, 2 pages, John Wiley & Sons, Ltd., http://www.credoreference.com/entry3480944, printed Nov. 30, 2007.

Oxford English Dictionary, Definition of "appliance", 1989, 2 pages, Second Edition, http://dictionary.oed.com/cgi/entry/50010774, printed Nov. 29, 2007.

Oxford English Dictionary, Definition of "associate", 1989, 5 pages, Second Edition, http://dictionary.oed.com/cgi/entry/50013492, printed Nov. 27, 2007.

Oxford English Dictionary, Definition of "enable", 1989, 5 pages, Second Edition, http://dictionary.oed.com/cgi/entry/50074423, printed Nov. 27, 2007.

PC Magazine, Definition of "S/PDIF", 3 pages, http://www.pcmag.com/encyclopedia_term, printed Nov. 26, 2007.

* cited by examiner

STORAGE ACCESS PRIORITIZATION USING A DATA STORAGE DEVICE

CROSS-REFERENCE TO RELATED APPLICATIONS/INCORPORATION BY REFERENCE

This application makes reference to and claims priority from U.S. Provisional Patent Application Ser. No. 60/570,356, entitled "STORAGE ACCESS PRIORITIZATION SCHEME FOR A NETWORK ATTACHED STORAGE SYSTEM", filed on May 11, 2004, the complete subject matter of which is incorporated herein by reference in its entirety.

This application makes reference to:
U.S. application Ser. No. 11/049,905, filed Feb. 3, 2005;
U.S. application Ser. No. 11/049,771, filed Feb. 3, 2005;
U.S. Application Ser. No. 60/562,847, filed Apr. 15, 2004;
U.S. Application Ser. No. 60/648,634, filed Jan. 31, 2005;
U.S. application Ser. No. 11/049,772, filed Feb. 3, 2005; and
U.S. application Ser. No. 11/049,768, filed Feb. 3, 2005.

The above stated applications are hereby incorporated herein by reference in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When accessing data from a data source such as a data storage device, it is often important that the data being accessed is delivered to a user or entity promptly with acceptable quality. When the data storage device is part of a packet switched network, delays or interruptions in transmission may provide a quality of service that is unacceptable to a user. For example, the transmission of speech data may be sensitive to the arrival time or variations in inter-arrival times of data packets. However, other bulk data, such as document files may not need to be transmitted in a particular temporal order and may not be sensitive to variations in packet inter-arrival times.

However, in many instances, the available bandwidth from a data source may not be effectively prioritized in relation to the type of data being transmitted. This may result in unintelligible playback of streaming data, such as speech, resulting in poor end-to end quality of service. In other instances, the available bandwidth may not be effectively managed, causing congestion at the source interface. This also causes poor end-to-end quality of service.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide one or more systems and methods of implementing one or more data access prioritization scheme that allow one or more data processing or computing devices to effectively access one or more data files from a data storage device.

In a representative embodiment, a method of allocating bandwidth to one or more data processing devices wherein the data processing devices seek access to data stored in a data storage device comprises using an admission control mechanism.

In another representative embodiment, a method of accessing one or more data files stored in a data storage device, in which the accessing is performed by one or more data processing devices, comprises prioritizing the access to the one or more data files by way of using one or more file types.

Yet in another representative embodiment, a method provides access to one or more data files that are stored in a data storage device. The one or more data files are provided to one or more data processing devices. The method comprises using one or more metadata associated with the one or more data files.

Another representative embodiment provides a method of allocating bandwidth to one or more data processing devices wherein the one or more data processing devices seek access to data stored in a data storage device. The method comprises using one or more data ports of the data storage device to prioritize access to the data stored in the data storage device.

Additionally, another representative embodiment provides a method of allocating bandwidth to one or more data processing devices in which the one or more data processing devices seek access to data stored in a data storage device. The method comprises using one or more data pools and/or share names to prioritize the access.

In yet another representative embodiment, a method of allocating bandwidth to one or more data processing devices comprises using one or more session requests generated by the one or more data processing devices, wherein one or more session request times are used to prioritize the access.

In a representative embodiment, a system of prioritizing access to one or more data files stored in a data storage device comprises a storage device containing the one or more data files, wherein the data storage device comprises one or more data storage drives, one or more data processing devices requesting access to the data files stored in the data storage device, a software resident in a memory of the data storage device, a processor executing the software, and a display on one of the one or more data processing devices.

These and other advantages, aspects, and novel features of the present invention, as well as details of illustrated embodiments, thereof, will be more fully understood from the following description and drawings.

DETAILED DESCRIPTION OF THE INVENTION

Figure 1:
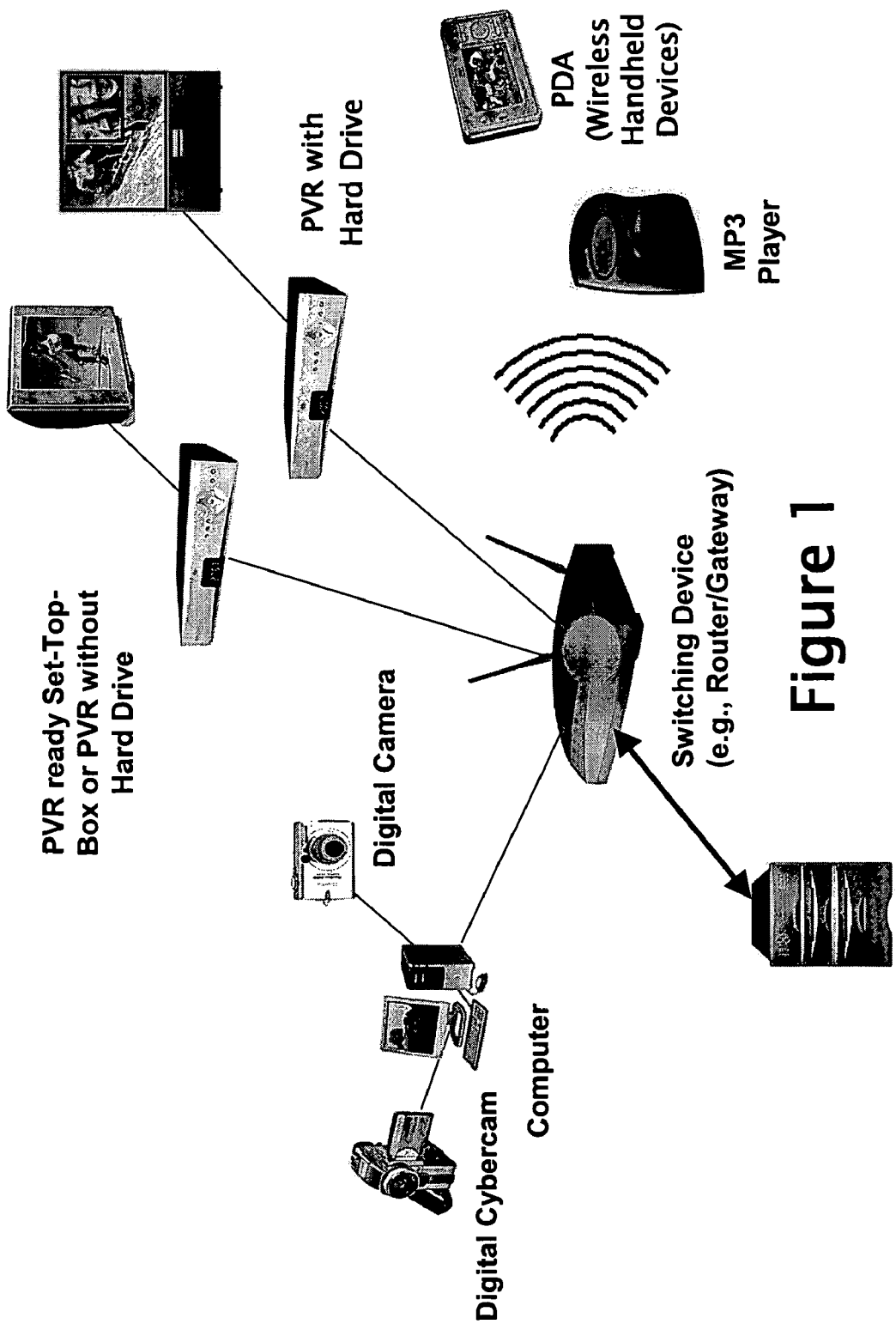
FIG. 1 illustrates a block diagram of a typical system incorporating the use of a network attached storage device (NAS) in accordance with an embodiment of the invention.

Various aspects of the present invention provide a system and a method of prioritizing access to data stored in a data storage device. The storage device is used by one or more data processing (or computing) devices that are communicatively coupled to the data storage device. The data storage device is connected or attached to a network such that the one or more data processing devices may write to or read from the data storage device. The one or more data processing devices may communicate with the data storage device through one or more networks. The previously mentioned data storage device, hereinafter, may be termed or referred to as a network attached storage device (NAS). The data storage device may comprise one or more data storage drives. The one or more data storage drives may comprise one or more hard disk drives. The data storage device may implement one or more data pools containing one or more data files. The data pools may span the one or more data storage drives, for example. A data pool may comprise one or more share directories (designated by their share names). The one or more data processing devices may comprise a desktop computer, a laptop computer, a PDA, a cellular phone, a digital camera, a video camcorder, digital recorder or a MP3 player, or any other device capable of accessing and utilizing the data stored in the NAS. The data stored in the NAS may comprise any type of data capable of being used by the one or more data processing devices. In a representative embodiment, the data comprises audiovisual or multimedia data provided by a telecommunications operator. The data may be received and processed by a set-top-box. The set-top-box may incorporate the use of a personal video recorder.

As described herein, a data storage device may comprise one or more data storage drives, such as hard disk drives, or any other type of drive. The data storage device may comprise a combination of different types of data storage drives. A data storage drive may comprise any type of media capable of storing data. Hereinafter, the term "hard disk drive" alternatively may refer to a data storage drive or any drive or component comprising a media used to store data. In a representative embodiment, one or more data storage drives or hard disk drives may be incorporated into a data storage device. The data storage device comprises the one or more data storage drives or hard disk drives. In a representative embodiment, the data storage device facilitates the incorporation of the one or more additional data storage drives or hard disk drives. The capacity of the data storage device may be increased by adding one or more data storage drives or hard disk drives to the data storage device. In a representative embodiment, connectors may be used to link one data storage drive to another data storage drive when data storage capacity is increased.

Aspects of the invention facilitate a user, such as an administrator of a network, to effectively manage the provisioning of bandwidth of one or more NAS' by way of using one or more graphical user interfaces. By prioritizing access to content stored in the one or more NAS', end-to-end quality of service to one or more users of the one or more data processing devices may be better assured.

Aspects of the invention allow the classification and prioritization of data stored in the NAS by way of categorizing one or more data file types. In a representative embodiment of the present invention, the type of data file is used as a basis to classify one or more data files and subsequently prioritize access to the one or more data processing devices. Yet, in another representative embodiment, the data is further categorized or classified by its associated metadata. The metadata is used as an additional differentiating factor or qualifier in terms of the data file categorization or classification process. In order to accomplish this process, packet tagging (or data packet tagging) may be used. Metadata information may be appended to one or more data packets when packet tagging is used. The metadata may comprise any parameter that qualifies or characterizes a data file. In one embodiment, packet tagging occurs by way of using the IEEE 802.1p protocol. In a representative embodiment, the metadata may undergo subsequent processing or interpretation. Based on the processing or interpretation, a priority level may be established for the metadata, and one or more bits may be used to represent a data packet's priority level.

The information contained in a packet tag may incorporate data that indicates a bandwidth priority level associated with the data packets of the data file. In a representative embodiment, up to eight priority levels may be used to differentiate and prioritize the various data files stored in the NAS. The eight priority levels may be specified using three bits, as may be implemented using IEEE 802.1p. For example, a priority scheme may be used that prioritizes data according to the following priority levels (from highest priority to the lowest priority): (1) voice or speech data (2) pay per view files (3) HDTV files (4) SDTV files; (5) MP3 files; and (6) bulk data files. In one embodiment, prioritized categorization or classification of data files occurs in the NAS. The prioritized categorization or classification may be managed or enforced by a gateway/router. The gateway/router may comprise a residential gateway/router. In one embodiment, the residential gateway/router supports the IEEE 802.1p protocol. In one embodiment, the tagged or classified packet priorities may be interpreted and enforced by the gateway/router. Use of the data file classification system described provides a method of prioritizing data and delivering end-to-end quality of service (QoS) to one or more users.

According to another aspect of the present invention, data access may be prioritized by way of the NAS' ports. In this embodiment, the NAS performs bandwidth provisioning to the one or more data processing devices based on its ports. The provisioning may be performed by way of port numbers or port types. One or more ports on the NAS may be used to communicate with the one or more data processing or computing devices. Data processing or computing devices, such as personal computers communicate or interface using various types of ports. These ports may comprise USB, serial, or parallel ports, for example.

Additional aspects of the invention provide for prioritization of data access based on data pools and/or share names. An administrator or user may use this method of prioritization to identify and provision bandwidth for the many departments in an organization or enterprise, based on one or more data pools and/or share names. For example, the data access requirements of a research and development department within an enterprise organization may require higher access priority than a marketing department, and one or more data pools and/or share names may be categorized and used for differentiating priority. As a consequence, available bandwidth may be assigned to the research and development department instead of the marketing department when the available bandwidth cannot accommodate the needs of both departments.

In an alternate embodiment, prioritizing the access to data stored in the data storage device may be session based, as may be determined by the NAS. For example, priority may be based on the time a request for access is made by a data processing or computing device (i.e., session request time). In other embodiments, session based prioritization may be used when other prioritization methods, previously discussed, are ineffective. For example, session based priority may be used when two data files are associated with equivalent port, file, and data pool priorities. In one embodiment, the session based prioritization may be accomplished using a gateway/router, such as a residential gateway/router. In such an instance, the enforcing device (e.g., the residential gateway) ensures that specific sessions are guaranteed a particular service level.

Alternatively, in another representative embodiment of the present invention, QoS is established by provisioning adequate bandwidth for the one or more data processing devices. In a representative embodiment, an additional 2× to 4× bandwidth headroom is allocated by using a NAS (acting as a data file server) that implements a bandwidth provisioning and headroom management scheme. The NAS serves one or more data files to one or more data processing devices in one or more networks using the bandwidth provisioning and headroom management scheme. In a representative embodiment, a gigabit Ethernet link is established between the NAS and the residential gateway, in order to adequately service the one or more data processing devices connected to the residential gateway. The gigabit Ethernet connection between the NAS and the residential gateway may be implemented using a bandwidth having 4× headroom.

FIG. 1 illustrates a block diagram of a typical system incorporating the use of a network attached storage device (NAS) 100 in accordance with an embodiment of the invention. The NAS 100 provides data storage for one or more data processing devices. As illustrated, a switching device provides connectivity of the NAS 100 to the one or more data processing devices. The switching device is capable of providing connectivity using wireless or wireline communications. For example, a wireless router may utilize any one of the following wireless or wireline data communications protocols: 10/100 Ethernet, gigabit Ethernet, 802.11x, Bluetooth, and the like. The one or more data processing devices may comprise devices such as a digital cybercam, digital camera, MP3 player, PDA, and one or more personal video recorders (PVRs). As illustrated, the PVR may be equipped with or without a hard disk drive. In one embodiment, the PVR may be referred to as a set-top-box (STB) that incorporates personal video recorder capabilities. In one embodiment, the PVR may be referred to as a PVR-STB. The PVRs illustrated, are connected to a television or a monitor capable of playing multimedia content to a home user. Use of the NAS 100 provides a centralized storage facility for multimedia content received by the one or more PVRs. As a consequence of storing content using a device such as the NAS 100, PVRs lacking a storage facility or medium, such as a hard disk drive, may easily store and share any data it receives. Further, any data stored by other data processing devices, including PVRs, may be easily accessed and viewed by any of the one or more data processing devices. For example, a PVR without hard drive may access multimedia content originally stored into the NAS 100 by a PVR with hard drive, and vice-versa. As a result, the NAS 100 facilitates sharing of data among the one or more data processing devices. The NAS 100 may be considered a "virtual storage device" by the one or more data processing devices. The NAS 100 may be configured such that its storage capacity may be easily expanded. For example, the NAS 100 may be configured for expansion, by providing one or more physical ports or openings in its chassis, in which one or more hard disk drives, or other devices capable of storing data, may be received by the NAS 100. As such, the NAS 100 provides an easily scalable and flexible storage mechanism that allows for future data storage growth. In addition, the NAS 100 provides mirroring and data striping functions.

Figure 2:
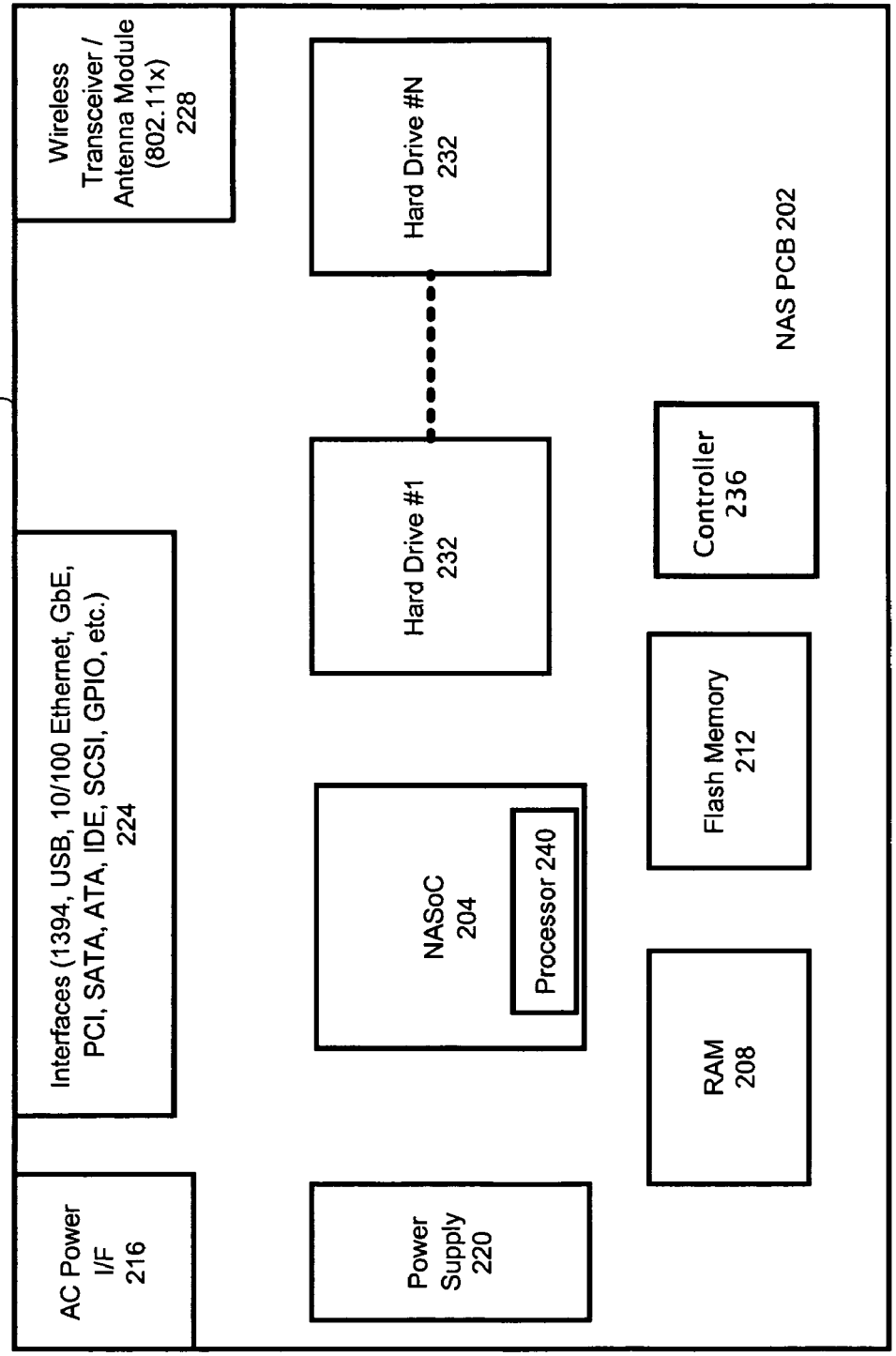
FIG. 2 is a block diagram of a NAS in accordance with an embodiment of the invention.

FIG. 2 is a block diagram of a network attached storage device (NAS) 200 in accordance with an embodiment of the invention. The NAS 200 comprises a printed circuit board (NAS PCB) 202 containing one or more components. The one or more components are electrically connected by way of the printed circuit board (PCB) 202. The one or more components comprises a NAS chip (NASoC) 204, a random access memory 208, a flash memory 212, an AC power interface 216, a power supply 220, a block of interfaces 224, a wireless transceiver/antenna module 228, one or more hard disk drives 232, and a controller 236. The interface block 224 may comprise one or more of the following interfaces: IEEE 1394, USB, 10/100 Ethernet, gigabit Ethernet, PCI, SATA, ATA, IDE, SCSI, GPIO, etc. The wireless transceiver/antenna module 228 may comprise an attachable module or mini-PCI card that may be optionally connected or attached to the NAS' printed circuit board 202. The one or more hard disk drives 232 may comprise any number of hard drives depending on the design of the NAS 200. The printed circuit board 202 may be configured to accommodate an appropriate number of hard disk drives. The number of hard drives utilized may depend on the type of mirroring or data striping (i.e., RAID) provided by the NAS 200. In one embodiment, the controller 236 provides control for any one of several devices connected to the NASoC 204. The NASoC 204 may comprise an integrated circuit chip incorporating a processor or central processing unit (CPU) 240.

Figure 3:
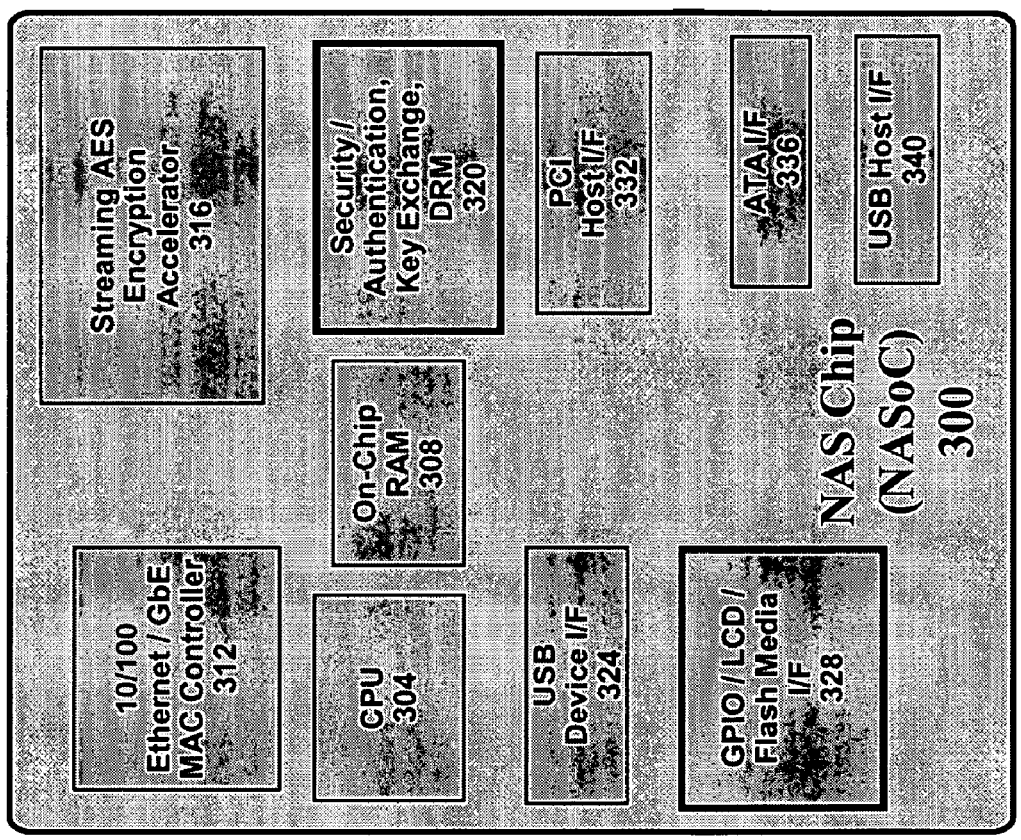
FIG. 3 is a block diagram of a network attached storage device chip (NASoC) in accordance with an embodiment of the invention.

FIG. 3 is a block diagram of a network attached storage device chip (NASoC) 300 in accordance with an embodiment of the invention. The NASoC 300 is an integrated circuit mounted on the previously described NAS PCB. The NASoC 300 provides one or more functions that allow the NAS to properly operate. The NASoC 300 generates the signals to enable the functions provided by the NAS previously described in reference to FIG. 2. The NASoC 300 comprises a central processing unit (CPU) 304, an on-chip random access memory 308, a Ethernet/MAC controller 312, an encryption accelerator 316, a security/authentication, key exchange, DRM chip 320, and a number of interfaces 324, 328, 332, 336, 340. The interfaces 324, 328, 332, 336, 340 may comprise, for example, the following type of interfaces: USB Device I/F 324, a PCI Host I/F 332, a GPIO/LCD/Flash Media I/F 328, an ATA I/F 336, and a USB Host I/F 340. The NAS chip 300 may communicate and/or connect to the one or more components described in reference to FIG. 2.

Referring to FIG. 2, the NAS may incorporate varying numbers of hard disk drives depending on its data storage and RAID (data mirroring and/or striping) requirements. The NAS 200 chassis may be configured to incorporate 1, 2, or 4 hard disk drives depending on type of use. For example, the NAS may utilize 4 hard disk drives for implementing RAID 0+1 or RAID 10 (both data mirroring and data striping), suitable for use in a small office/business environment. Aspects of the invention allow the use of hard disk drives of different capacities, types, and/or speeds when implementing RAID functions. The NAS 200, for example, may utilize only 1 or 2 hard disk drives in a home (or household) environment since the storage capacity utilized is typically less than that utilized in an office or business environment. Similarly, memory components utilized in the NAS may be varied depending on type of use. As the data storage requirements increase and as the frequency of data storage related requests increase, the performance of the NAS may be improved to meet its operational needs, by way of increasing memory size of the NAS. For example, flash or DRAM memory capacities may be increased in order to improve the processing performance of the NAS. Similarly, the chassis size, power circuitry, and other components may be adjusted to meet the processing requirements of its operational environment.

Figure 4:
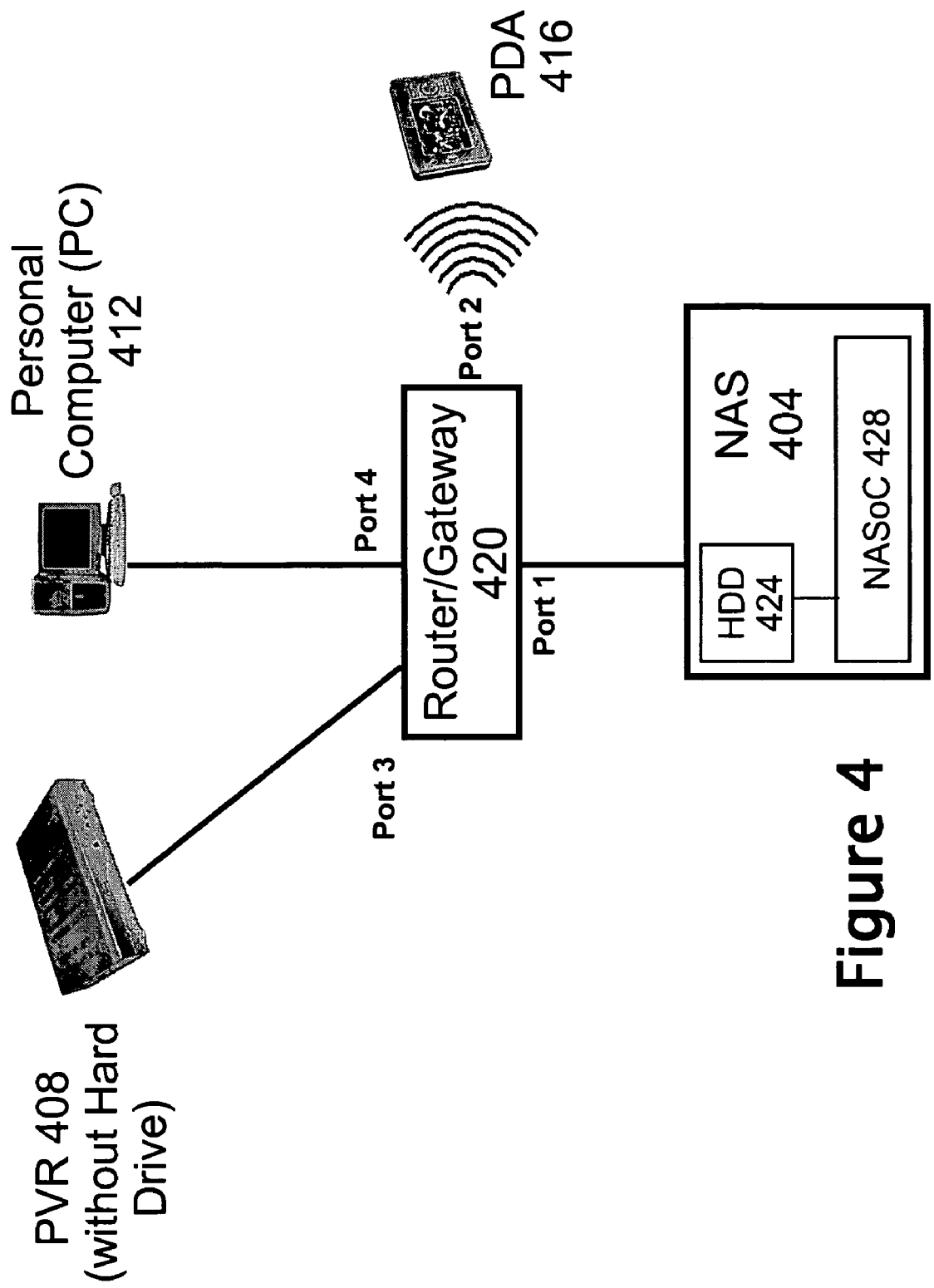
FIG. 4 illustrates a bandwidth provisioning and headroom management system utilizing a NAS and one or more data processing devices, in accordance with an embodiment of the invention.

FIG. 4 illustrates a bandwidth provisioning and headroom management system utilizing a NAS 404 and one or more data processing devices 408, 412, 416, in accordance with an embodiment of the invention. The system comprises the NAS 404, a router/gateway 420, a personal video recorder (PVR) 408, a personal computer 412, and a PDA 416. The NAS 404 comprises a NAS chip (NASoC) 428 and one or more hard disk drives (HDD) 424. In a representative embodiment, the NAS 404 comprises a file server that controls the transmission of data files to one or more data processing devices (PVR, PC, PDA) 408, 412, 416, by way of bandwidth provisioning and headroom management of the available bandwidth provided by the NAS 404. As shown in FIG. 4, the transmission of data files may occur by way of the router/gateway 420. The router/gateway 420 may comprise a number of ports. In FIG. 4, port 2 comprises an exemplary wireless port while ports 1, 3, and 4 comprise wireline ports. Port 2 may communicate to the PDA 416 by way of a wireless protocol such as IEEE802.11x while ports 1, 3, and 4 may communicate to the NAS 404, PVR 408, and PC 412, respectively, using IEEE 802.3x, for example. The communication link between the NAS 404 and router/gateway 420 may comprise a high speed link, such as gigabit Ethernet since the NAS 404 provides downloads to the one or more data processing devices. The NAS 404 may store software in its memory which, when executed, accomplishes the bandwidth provisioning and the headroom management. The bandwidth provisioning and headroom management may occur by way of an admission control mechanism that employs one or more algorithms. A processor within the NAS 404, for example, may be used to execute the software. In this representative embodiment, the main goal of the admission control mechanism is the prevention of bandwidth overload as the one or more data processing devices seek access to data stored in the NAS 404. The NAS 404 and the router/gateway 420 may cooperatively employ the admission control mechanism. The admission control mechanism may accept a new session, for example, when the file server deems that adequate capacity exists for processing all future requests related to the new session. In a representative embodiment, the admission control mechanism may accept a new session when a particular bandwidth headroom constraint is additionally satisfied. For example, if the NAS 404 is functioning near its bandwidth capacity, a new session request will be rejected or may be redirected to another available NAS 404 that is capable of providing the same data. In a representative embodiment, the admission control mechanism may utilize a RSVP (resource reservation protocol). In another representative embodiment, the NAS 404 and router/gateway 420 may cooperatively incorporate the use of a packet tagging protocol such as IEEE 802.1p as a mechanism to prioritize access to data (packets) provided by the NAS 404.

Figure 5:
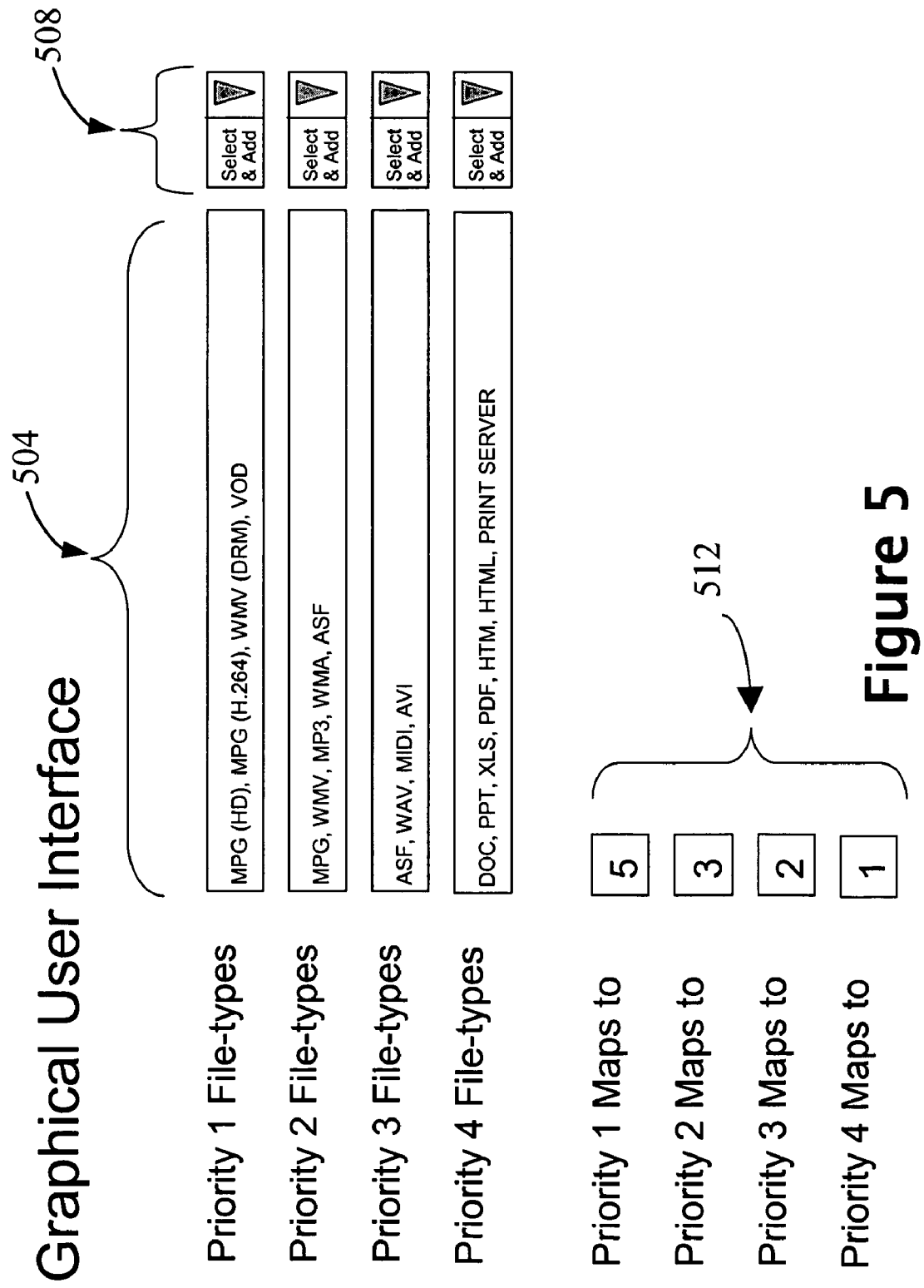
FIG. 5 illustrates a diagram of a graphical user interface (GUI) that allows a user (such as an administrator) to prioritize access to data in a storage device using one or more file types, in accordance with an embodiment of the invention.

FIG. 5 illustrates a diagram of a graphical user interface (GUI) that allows a user (such as an administrator) to prioritize access to data in a storage device using one or more file types, in accordance with an embodiment of the invention. The types of data files stored in a NAS are identified using the following exemplary identifiers: MPG (HD), MPG (H.264), WMV (DRM), VOD, MPG, WMV, MP3, WMA, ASF, WAV, MIDI, AVI, DOC, PPT, XLS, PDF, HTM, HTML, etc. FIG. 5 illustrates one or more first input fields 504 in the upper portion of the GUI that allow a user to indicate one or more file types. The user may categorize certain file types into a priority level using the one or more first input fields 504. As illustrated in FIG. 5, the first input fields 504, in this representative embodiment, comprise 4 fields. The file types are selected by way of one or more pull down buttons 508 located to the right side of the one or more first input fields 504. In this representative embodiment, a user has specified that the following file types are to be prioritized as level 5 priority: MPG (HD), MPG(H.264), WMV (DRM), VOD. On a scale of 1 to 5, level 5 is recognized as the highest level of priority, in this embodiment. In the lower portion of the GUI, a user may input one or more values into one or more second input fields 512 specifying a priority level associated with its corresponding one or more first input fields 504. For example, FIG. 5 illustrates that the file types MPG (HD), MPG(H.264), WMV (DRM), VOD are to be given a level 5 priority. As previously described, aspects of the invention may comprise a system and a method of incorporating metadata as an additional qualifier to prioritize the one or more different files types. In the embodiment of FIG. 5, a user has specified metadata that further differentiates a file type (MPG) into two files types. As shown in the "Priority 1 File-types" field, the file type indicated using the identifier—MPG (i.e., MPEG or Motion Picture Experts Group related files) may be further differentiated using metadata qualifiers, such as HD or H.264. In this embodiment, metadata is specified using parentheses, after the file type is specified. In this representative embodiment, the HD metadata refers to high definition formatting while the H.264 metadata refers to MPEG-4 ISO/IEC standard formatting. The embodiment of FIG. 5 also illustrates the identifier—WMV(DRM), that specifies Windows Media Video type data files, along with metadata—DRM (Digital Rights Management) used as a qualifier. In other embodiments, it is contemplated that other types of syntax or formatting may be used to specify the types of files and any of its associated metadata. Referring To FIG. 5, the second field (Priority 2 File-types) of the one or more first input fields 504 illustrates a user who has specified a priority level pertaining to all MPEG files, other than the highest priority MPEG files defined in the first field of the one or more first input fields 504. The user appropriately inputs the identifier by inputting the identifier—MPG without any additional metadata qualifiers. Hence, in this particular embodiment, all MPG files, other than MPG(HD) and MPG(H.264) files would be categorized under the Priority 2 File—types category.

In addition, the various aspects of the present invention allow for packet tagging to be used to identify and/or append one or more packets using file type and its associated metadata. In a representative embodiment, packet tagging occurs by way of using an exemplary IEEE 802.1p protocol. As shown in Table 1, IEEE 802.1p provides eight levels of priority when performing packet tagging of packets, as opposed to four levels provided in the embodiment of FIG. 5. Referring to Table 1, a higher priority is associated with a higher User Priority number. The one or more second input fields 512 may be used to map the priority levels associated with the one or more first input fields 504 to priority levels associated with the 802.1p protocol as shown in Table 1 below.

TABLE 1

User Priority to Traffic Class Mapping

| User Priority | Traffic Type |
|---|---|
| 0 | Background |
| 1 | Spare |
| 2 | Best Effort |
| 3 | Excellent Effort |
| 4 | Controlled Load |
| 5 | Video |
| 6 | Voice |
| 7 | Network Control |

In the representative embodiment illustrated in FIG. 5, priority 1 file types are mapped to user priority 5 of the 802.1p protocol standard. As illustrated in Table 1, user priority 5 corresponds to traffic type that comprises video. Referring to FIG. 1, priority 2 file types are mapped to user priority 3 of the 802.1p protocol standard. User priority 3 of 802.1p corresponds to traffic type associated with "excellent effort" type of transmission. Again referring to FIG. 1, priority 3 file types are mapped to user priority 2 (best effort) of the 802.1p protocol standard while priority 4 file types are mapped to user priority 1 (spare) of the 802.1 protocol standard. Although not illustrated in FIG. 5, it is contemplated that in certain embodiments, files that correspond to voice data packets may be mapped to user priority 6 of the 802.1p protocol standard.

Figure 6:
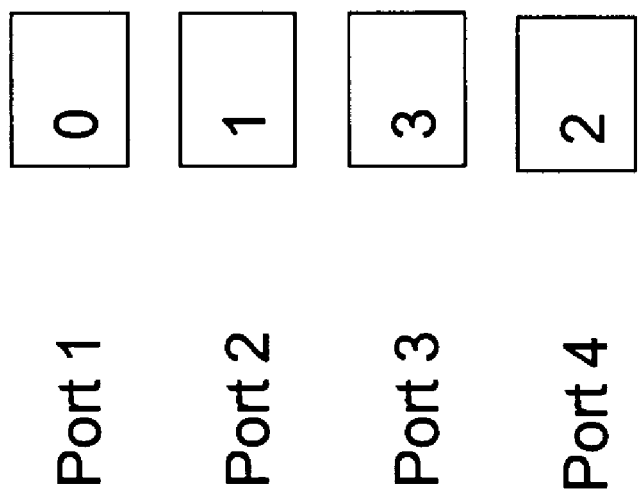
FIG. 6 illustrates a diagram of a GUI that allows a user to prioritize access to data stored in a NAS by way of one or more ports, in accordance with an embodiment of the invention.

FIG. 6 illustrates a diagram of a graphical user interface (GUI) that allows a user to prioritize access to data stored in a NAS by way of one or more ports, in accordance with an embodiment of the invention. As shown, one or more values or priority levels may be input into one or more fields associated with the one or more ports. In this example, Port 1 is assigned a priority level 0, Port 2 is assigned a priority level 1, Port 3 is assigned a priority level 3, and Port 4 is assigned a priority level 2. It is contemplated that prioritization based on port priority may at times conflict with prioritization based on file type (with or without metadata) priority. As a consequence, aspects of the invention provides for a resolution policy for resolving instances in which data files having a high priority based on data type is routed to a port assigned to a low priority rank, and vice-versa. In a representative embodiment, the resolution policy provides that data which is prioritized based on file type and metadata (if applicable), takes precedence over port based priority. In an alternate representative embodiment, the resolution policy provides that data that is prioritized based on file port based priority takes precedence over file type and metadata based priority. It is contemplated that the user may configure the resolution policy to suit his particular needs.

Figure 7:
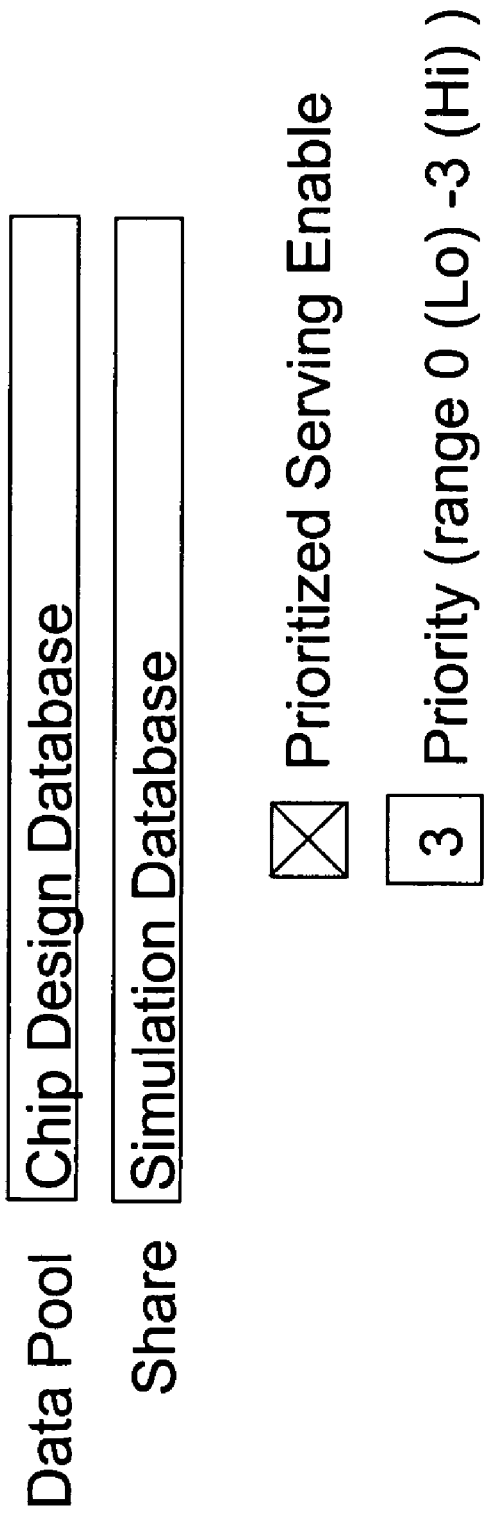
FIG. 7 illustrates a diagram of a GUI that allows a user to prioritize access to data stored in NAS by way of data pool and share name, in accordance with an embodiment of the invention.

FIG. 7 illustrates a diagram of a graphical user interface (GUI) that allows a user to prioritize access to data stored in NAS by way of data pool and share name, in accordance with an embodiment of the invention. As shown in FIG. 7, a user inputs a data pool name into a data pool field in which a share is to be established. In this representative embodiment, the exemplary data pool name is called "Chip Design Database". Likewise, an appropriate share name is input into the share name field. For example, "Simulation Database", may be used as the share name. As shown, a radio button may be used to selectively enable data pool/share based priority. In this representative embodiment, a priority level input field allows a user to input a value designating the priority level associated with a particular data pool/share combination. The priority level may comprise any range of values and may range from 0 (Lo) to 3 (High), as shown in the representative embodiment of FIG. 7.

The aforementioned prioritization schemes may be implemented by executing software that resides within the NAS. The execution may be controlled and monitored by way of a data processing device such as a personal computer (PC) communicatively coupled to the NAS. The software may be downloaded into a memory (e.g., flash memory) of the NAS by way of control provided by, for example, any data processing or computing device communicatively coupled to the NAS. As referenced in FIG. 2, the NAS may comprise a motherboard or printed circuit board (PCB) containing a RAM and a flash memory. As shown in FIG. 2, the flash memory may contain the software while the RAM may contain one or more values generated from executing the software. In addition, the PCB may incorporate a processor or CPU that executes the software resident in the flash memory, and which facilitates the operation of the bandwidth provisioning and the headroom management schemes or mechanisms previously discussed. In a representative embodiment, the processor or processing circuitry is implemented within the NASoC previously described. In another representative embodiment, the processor within the NASoC executes software or firmware residing within the RAM of the NAS PCB or motherboard (cf. FIG. 2) when the NAS is booted up or powered up. In a representative embodiment, execution of the software or firmware generates one or more graphical user interfaces allowing a user to configure and implement data file based priority, port based priority, session based priority, or data pool/share based priority as was previously described in relation to FIGS. 5-7.

In a representative embodiment, execution of the software stored in the RAM of the NAS PCB, as referenced in FIG. 2, causes an http server to serve pages to a data processing device (e.g., a personal computer), thereby facilitating the display of one or more types of graphical user interfaces to a user. The NAS, for example, may comprise the http server. The graphical user interfaces may be used by the user to configure one or more priority access schemes previously described.

In a representative embodiment, a manufacturer of the NAS may pre-configure, preset, or create a default configuration specifying the priority levels associated with each of the one or more file types previously described in reference to FIG. 5. For example, the priority levels may be preset by way of a default configuration within a memory of the NAS. The manufacturer may provide a default configuration when a NAS is manufactured or designed, for example. Similarly, the manufacturer of the NAS may pre-configure the one or more priority levels associated with one or more data ports of the NAS. The one or more priority levels associated with the one or more data ports may be pre-configured when the NAS is manufactured. The default configurations provided by the manufacturer may be modified by a user.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of accessing one or more data files stored in a data storage device by one or more data processing devices, said method comprising:

prioritizing said access to said one or more data files by way of using one or more file types, said data storage device comprising one or more data storage drives, said data storage device capable of implementing at least one data pool, said at least one data pool formed by concatenating a number of partitions of said one or more data storage drives, said at least one data pool capable of storing said one or more data files, wherein said one or more data files comprises an MPEG data file.

2. A method of prioritizing access to one or more data files that are stored in a data storage device, said method comprising:

using metadata associated with said one or more data files, said data storage device comprising a plurality of data storage drives; and prioritizing said access of said one or more data files using said metadata, wherein said metadata is interpreted and/or processed to generate one or more priority levels, said one or more priority levels is represented using one or more bits of each data packet of one or more data packets of said one or more data files, said one or more bits comprises three bits used to identify eight priority levels, wherein said eight priority levels is used to prioritize said access to said one or more data files, said one or more data files comprising voice or speech data files.

3. A method of prioritizing access to one or more data files that are stored in a data storage device, said method comprising:

using metadata associated with said one or more data files, said data storage device comprising a plurality of data storage drives; and prioritizing said access of said one or more data files using said metadata, wherein said metadata is interpreted and/or processed to generate one or more priority levels, said one or more priority levels is represented using one or more bits of each data packet of one or more data packets of said one or more data files, said one or more bits comprises three bits used to identify eight priority levels, wherein said eight priority levels is used to prioritize said access to said one or more data files, said one or more data files comprising HDTV data files.

4. A method of prioritizing access to one or more data files that are stored in a data storage device, said method comprising:

using metadata associated with said one or more data files, said data storage device comprising a plurality of data storage drives; and prioritizing said access of said one or more data files using said metadata, wherein said metadata is interpreted and/or processed to generate one or more priority levels, said one or more priority levels is represented using one or more bits of each data packet of one or more data packets of said one or more data files, said one or more bits comprises three bits used to identify eight priority levels, wherein said eight priority levels is used to prioritize said access to said one or more data files, said one or more data files comprising SDTV data files.

5. A method of prioritizing access to one or more data files that are stored in a data storage device, said method comprising:

using metadata associated with said one or more data files, said data storage device comprising a plurality of data storage drives; and prioritizing said access of said one or more data files using said metadata, wherein said metadata is interpreted and/or processed to generate one or more priority levels, said one or more priority levels is represented using one or more bits of each data packet of one or more data packets of said one or more data files, said one or more bits comprises three bits used to identify eight priority levels, wherein said eight priority levels is used to prioritize said access to said one or more data files, said one or more data files comprising MP3 data files.

6. A system for accessing one or more data files stored in a data storage device by one or more data processing devices, said system comprising:

one or more circuits operable for, at least:

prioritizing said access to said one or more data files by way of using one or more file types, said data storage device comprising one or more data storage drives, said data storage device capable of implementing at least one data pool, said at least one data pool formed by concatenating a number of partitions of said one or more data storage drives, said at least one data pool capable of storing said one or more data files, wherein said one or more data files comprises an MPEG data file.

7. A system for prioritizing access to one or more data files that are stored in a data storage device, said method comprising:

one or more circuits operable for, at least:

using metadata associated with said one or more data files, said data storage device comprising a plurality of data storage drives; and prioritizing said access of said one or more data files using said metadata, wherein said metadata is interpreted and/or processed to generate one or more priority levels, said one or more priority levels is represented using one or more bits of each data packet of one or more data packets of said one or more data files, said one or more bits comprises three bits used to identify eight priority levels, wherein said eight priority levels is used to prioritize said access to said one or more data files, said one or more data files comprising voice or speech data files.

8. A system for prioritizing access to one or more data files that are stored in a data storage device, said method comprising:

one or more circuits operable for, at least:

using metadata associated with said one or more data files, said data storage device comprising a plurality of data storage drives; and prioritizing said access of said one or more data files using said metadata, wherein said metadata is interpreted and/or processed to generate one or more priority levels, said one or more priority levels is represented using one or more bits of each data packet of one or more data packets of said one or more data files, said one or more bits comprises three bits used to identify eight priority levels, wherein said eight priority levels is used to prioritize said access to said one or more data files, said one or more data files comprising HDTV data files.

9. A system for prioritizing access to one or more data files that are stored in a data storage device, said method comprising:

one or more circuits operable for, at least:

using metadata associated with said one or more data files, said data storage device comprising a plurality of data storage drives; and prioritizing said access of said one or more data files using said metadata, wherein said metadata is interpreted and/or processed to generate one or more priority levels, said one or more priority levels is represented using one or more bits of each data packet of one or more data packets of said one or more files, said one or more bits comprises three bits used to identify eight priority levels, wherein said eight priority levels is used to prioritize said access to said one or more data files, said one or more data files comprising SDTV data files.

10. A system for prioritizing access to one or more data files that are stored in a data storage device, said method comprising:

one or more circuits operable for, at least:

using metadata associated with said one or more data files, said data storage device comprising a plurality of data storage drives; and prioritizing said access of said one or more data files using said metadata, wherein said metadata is interpreted and/or processed to generate one or more priority levels, said one or more priority levels is represented using one or more bits of each data packet of one or more data packets of said one or more data files, said one or more bits comprises three bits used to identify eight priority levels, wherein said eight priority levels is used to prioritize said access to said one or more data files, said one or more data files comprising MP3 data files.

* * * * *